E. L. THURBER & M. JUDGE.
COMBINED COOKING, DRYING, AND CONVEYING MACHINE.
APPLICATION FILED FEB. 2, 1910.
989,447.
Patented Apr. 11, 1911.
2 SHEETS—SHEET 1.
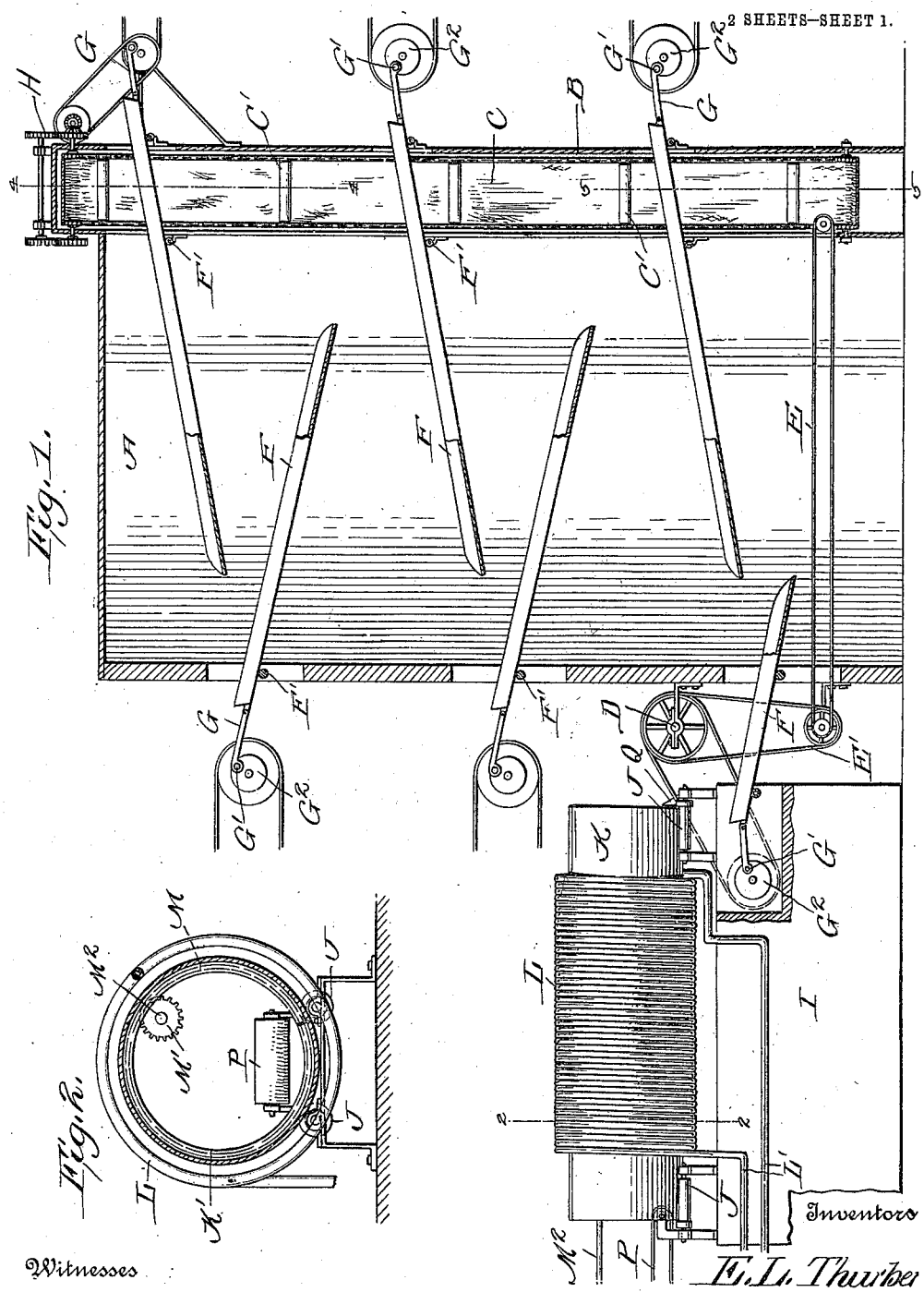

E. L. THURBER & M. JUDGE.
COMBINED COOKING, DRYING, AND CONVEYING MACHINE.
APPLICATION FILED FEB. 2, 1910.
989,447.
Patented Apr. 11, 1911.
2 SHEETS—SHEET 2.
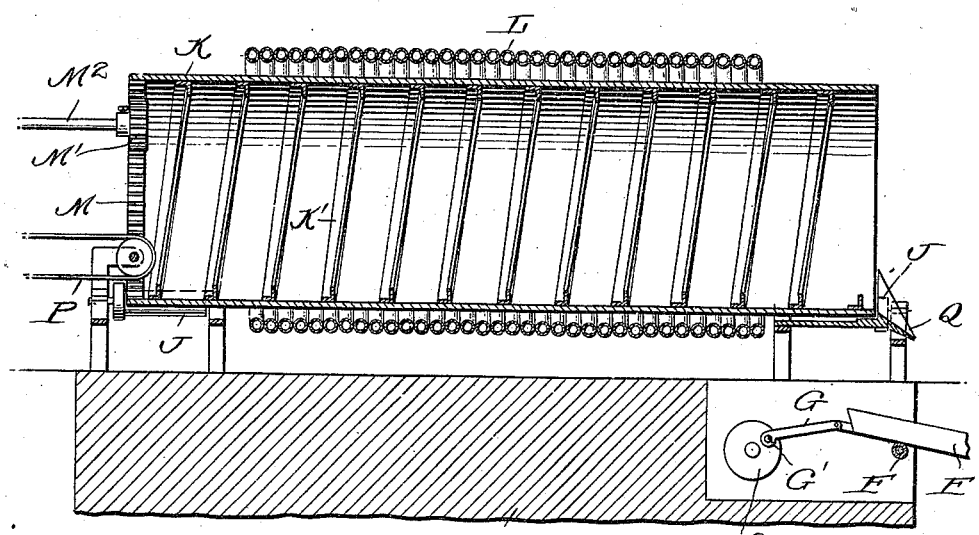
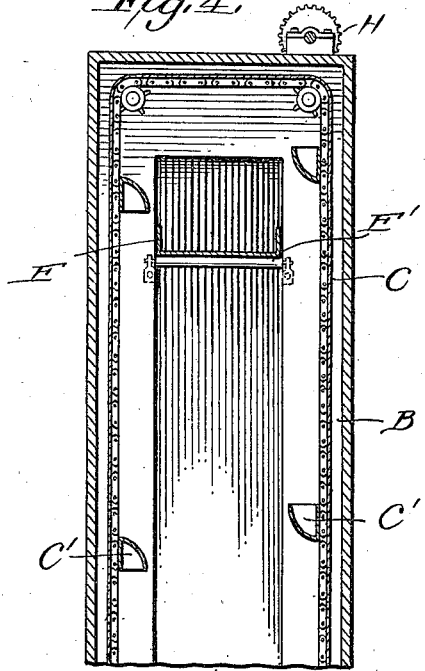
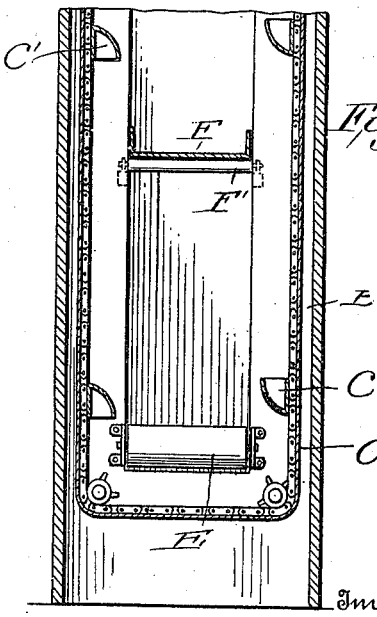

UNITED STATES PATENT OFFICE.

EDWIN L. THURBER AND MATTHEW JUDGE, OF BROOKLYN, NEW YORK.

COMBINED COOKING, DRYING, AND CONVEYING MACHINE.

989,447. Specification of Letters Patent. Patented Apr. 11, 1911.

Application filed February 2, 1910. Serial No. 541,514.

*To all whom it may concern:*

Be it known that we, EDWIN L. THURBER and MATTHEW JUDGE, citizens of the United States, residing in Brooklyn, in the county of Kings and State of New York, have invented a new and useful Improvement in Combined Cooking, Drying, and Conveying Machines, of which the following is a specification.

This invention relates to drying machines, especially adapted to be used for drying fruits of all kinds, the object being to provide a machine which is so constructed that the fruit fed into the same will pass over a series of vibrating chutes in such a manner that the fruit will be thoroughly dried in a very short time.

Another object of the invention is to provide a drying machine in which a rotary cooking drum is employed into which the fruit to be dried is fed and through which said fruit passes onto a shaking chute which delivers the same onto an endless conveyer mounted within a housing, said conveyer delivering the same onto an endless elevator which delivers the same onto a shaking chute from which said fruit passes onto a number of shaking chutes arranged within the housing in such a manner that the fruit will be agitated as it passes over the chutes and be delivered onto the endless conveyer where it can be either carried back to the elevator or out through the machine.

A still further object of the invention is to provide a drying machine which will dry fruit in such a manner that the fruit passed through the same will be dried thoroughly thereby overcoming the disadvantages with driers now in use in which a series of endless conveyers are arranged.

Another object of the invention is to provide a drying machine which is exceedingly simple and cheap in construction and one in which the fruit can be passed through the same any number of times without having to touch the same in any way whereby the fruit will be agitated while it is being dried so as to prevent only a portion of the fruit from being acted on by the heat.

Another object of the invention is to provide a revoluble cooking drum having a spiral rib forming a conveyer into which the fruit is adapted to be delivered, said drum being heated by a steam coil so that the fruit will be cooked and dried, to a certain extent before it passes into the housing.

With these and various other objects in view, our invention consists in the novel features of construction, combination and arrangement of parts hereinafter fully described, pointed out in the claim and shown in the accompanying drawings, in which, Figure 1 is a side elevation of our improved cooking machine partly in section. Fig. 2 is an enlarged section taken on line 2—2 of Fig. 1. Fig. 3 is a longitudinal section through the cooking cylinder or drum. Fig. 4 is an enlarged section taken on line 4—4 of Fig. 1. Fig. 5 is an enlarged section taken on line 5—5 of Fig. 1.

In carrying out our improved invention, we employ a housing A with an open end communicating with an enlarged shaft B in which is mounted an endless elevator C on which is adapted to be deposited the fruit from an endles conveyer E. Mounted within the lower portion of the casing, said conveyer extending out thorugh the housing and being driven by a belt E' from a pulley carried by a power shaft D. The housing is adapted to be heated by any suitable means and is preferably formed rectangular in shape as clearly shown and has openings formed therein through which extend inclined vibrating chutes F so arranged within the housing with respect to each other that the fruit deposited upon the upper end will will pass over the same onto the next chute below and so on down over the series of chutes until it is deposited onto the endless conveyer E. These chutes F are preferably mounted on roller bearings F' as clearly shown and the chutes are provided with pivoted actuating arms G having bearings at their outer ends pivotally mounted on the eccentrically arranged pins G' extending outwardly from pulleys $G^2$ which are driven by suitable belts as clearly shown. It will be seen that one series of chutes extend through the elevator shaft B so that the fruit carried upwardly by the endless elevator C will be deposited upon the upper chute so that the same will be agitated as it passes over the series of oppositely arranged chutes in such a manner that the same will be thoroughly dried.

The endless elevator is provided with a series of conveying buckets C' and is driven through the medium of gearing H arranged at the upper end of the shaft as clearly shown so that the elevator can be driven at any speed desired in order that the fruit deposited thereon by the endless conveyer E will be carried upwardly and deposited upon the upper vibrating chute in such quantities that the chutes will not be overloaded so that the fruit deposited upon the same will be agitated in such a manner that it will be thoroughly dried.

Arranged adjacent the housing A is a base I having arranged thereon roller bearings J on which is revolubly mounted an open end cooking drum or cylinder K having an internal spirally arranged rib K' forming a screw conveyer. The bearings J are provided with flanged ends adapted to extend up above the ends of the drum or cylinder K in such a manner as to prevent the same from moving longitudinally and surrounding the central portion of the drum or cylinder K is a steam coil L which is adapted to be connected to a suitable boiler by the pipes L' so that the drum or cylinder will be heated in such a manner that the fruit deposited therein will be cooked to a certain extent before it reaches the drying housing A.

The cylinder K is provided with an internal rack M which is engaged by a gear M' carried by a driving shaft M² so that the cylinder will be rotated in such a manner that the speed of the same can readily be increased or decreased. Extending into the cylinder at one end is an endless conveyer P on which the fruit to be dried is adapted to be placed so that the same will be deposited into the cylinder and arranged at the opposite end of the cylinder is a fixed chute Q so arranged with respect to the lower shaking chute F that fruit carried through the cylinder K will be deposited upon the same which will deposit the same upon the endless conveyer E which in turn carries the fruit over to the elevator and it will be seen that after the fruit has been passed through the cooking drum K it can be carried over the series of vibrating chutes any number of times desired, in order to dry the same thoroughly. After the fruit has been thoroughly dried by reversing the endless conveyer E by reversing mechanism not shown the fruit within the housing will be carried out of the same and can be deposited into any suitable receptacle arranged under the outer end of the conveyer E.

From the foregoing description it will be seen that we have provided a drying machine in which a revoluble cooking drum is employed for cooking the fruit, to a certain extent before the same enters the drying housing. It will also be seen that we have provided a drying housing in which a number of shaking chutes are arranged in such a manner that the fruit carried upwardly by the endless elevator will be deposited upon the upper chute where it will be dried to a certain extent and at the same time agitated and from which it is deposited onto a second chute and so on down over the series of chutes until it reaches the endless conveyer where it is carried back to the endless elevator and the operation repeated. It will also be seen that the construction of elevator is such that the vibrating shakers can readily pass between the run-ways of the same and the shakers are so mounted in slots or openings of the walls of the elevator shaft and housing that they will be allowed to move freely and at the same time any unnecessary loss of heat in the housing is prevented.

Wha we claim is:—

In a cooking and drying apparatus, the combination with a housing provided with a shaft at one end, of a series of oppositely arranged inclined chutes arranged in said housing, means for shaking said chutes, a cooking drum arranged adjacent said housing, an endless conveyer leading to said cooking drum and a chute arranged under one end of said cooking drum for guiding the fruit from said drum onto one of said shaking chutes, together with means for conveying said fruit to the upper shaking chute.

EDWIN L. THURBER.
MATTHEW JUDGE.

Witnesses:
FREDERICK T. FISHER,
FRANKLYN DOE.

---

Copies of this patent may be obtained for five cents each, by addressing the "Commissioner of Patents, Washington, D. C."